(12) United States Patent
Burg

(10) Patent No.: US 8,891,410 B2
(45) Date of Patent: Nov. 18, 2014

(54) VOICE-OVER-IP ENABLED CHAT

(71) Applicant: AT&T Intellectual Property II, L.P., Atlanta, GA (US)

(72) Inventor: Frederick Murray Burg, West Long Branch, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 71 days.

(21) Appl. No.: 13/687,340

(22) Filed: Nov. 28, 2012

(65) Prior Publication Data

US 2013/0156024 A1   Jun. 20, 2013

Related U.S. Application Data

(63) Continuation of application No. 12/643,005, filed on Dec. 21, 2009, now Pat. No. 8,355,349, which is a (Continued)

(51) Int. Cl.
*H04L 12/16*   (2006.01)
(Continued)

(52) U.S. Cl.
CPC ............... *H04L 65/40* (2013.01); *H04L 51/04* (2013.01); *H04M 2207/203* (2013.01); *H04M 3/4281* (2013.01); *H04M 2203/4536* (2013.01); *H04L 65/1069* (2013.01); *H04M 7/0045* (2013.01); *H04M 15/90* (2013.01); *H04L 12/1813* (2013.01); *H04M 3/567* (2013.01); *H04M 3/42008* (2013.01); *H04M 2215/016* (2013.01); *H04L 12/581* (2013.01); *H04L 29/06027* (2013.01); *Y10S 379/90* (2013.01)
USPC ............................. 370/260; 370/352; 379/900

(58) Field of Classification Search
CPC ..... H04L 12/582; H04L 51/046; H04L 51/06; H04L 51/18; H04L 65/1069; H04L 65/403; H04M 2207/203; H04M 3/4281; H04M 7/0024; H04M 7/0033; H04M 7/0057
USPC ................................... 370/260, 352; 379/900
See application file for complete search history.

(56) References Cited

U.S. PATENT DOCUMENTS 3,671,865 A   6/1972   Szumila et al.
5,654,957 A   8/1997   Koyama
(Continued)

FOREIGN PATENT DOCUMENTS

EP   817457 A2   1/1998

OTHER PUBLICATIONS

Dr. Zhongwen Zhu, "An IMS based Inter-Working Solution for Multimedia Service in a Converged Network", System Manager, PDU Messaging, Ericsson Canada Inc. Montreal, Canada 2008 IEEE.

(Continued)

*Primary Examiner* — Dang Ton
(74) *Attorney, Agent, or Firm* — Wolff & Samson, PC

(57) ABSTRACT

A network-based system and method for providing anonymous voice communications using the telephone network and data communications links under the direction of a Call Broker and associated network elements. A user (the call initiator) present in a text chat room session establishes a data connection to Call Broker and, after qualifying for access (e.g., using credit card information) and providing a callback number, receives voice session information and participant access codes for each desired participant in a voice call. The initiator causes session information and participant codes to be passed to one or more selected chat participants in the current text chat room. When a selected participant uses the received session information, and enters the received participant code and a callback number, the Call Broker in cooperation with a Network Adjunct Processor (NAP) completes voice links to the initiator and the selected participant(s).

8 Claims, 3 Drawing Sheets

Related U.S. Application Data continuation of application No. 11/189,281, filed on Jul. 26, 2005, now Pat. No. 7,660,294, which is a continuation of application No. 09/326,263, filed on Jun. 7, 1999, now Pat. No. 7,039,040.

(51) Int. Cl.

| | | |
|---|---|---|
| *H04L 12/66* | (2006.01) | |
| *H04L 12/58* | (2006.01) | |
| *H04L 29/06* | (2006.01) | |
| *H04M 7/00* | (2006.01) | |
| *H04M 15/00* | (2006.01) | |
| *H04L 12/18* | (2006.01) | |
| *H04M 3/56* | (2006.01) | |
| *H04M 3/42* | (2006.01) | |
| *H04M 3/428* | (2006.01) | |

(56) References Cited

U.S. PATENT DOCUMENTS

| | | | |
|---|---|---|---|
| 5,721,763 A | 2/1998 | Joseph et al. | |
| 5,805,587 A | 9/1998 | Norris et al. | |
| 5,809,128 A | 9/1998 | McMullin | |
| 5,867,494 A | 2/1999 | Krishnamurthy et al. | |
| 5,907,677 A | 5/1999 | Glenn et al. | |
| 5,943,399 A | 8/1999 | Bannister et al. | |
| 5,958,014 A | 9/1999 | Cave | |
| 6,031,836 A | 2/2000 | Haserodt | |
| 6,078,581 A * | 6/2000 | Shtivelman et al. | 370/352 |
| 6,175,619 B1 | 1/2001 | DeSimone | |
| 6,195,358 B1 | 2/2001 | Bowater et al. | |
| 6,212,261 B1 * | 4/2001 | Meubus et al. | 379/88.12 |
| 6,259,691 B1 | 7/2001 | Naudus | |
| 6,272,126 B1 * | 8/2001 | Strauss et al. | 370/352 |
| 6,289,333 B1 | 9/2001 | Jawahar et al. | |
| 6,337,858 B1 | 1/2002 | Petty et al. | |
| 6,346,952 B1 | 2/2002 | Shtivelman | |
| 6,353,611 B1 * | 3/2002 | Norris et al. | 370/356 |
| 6,389,114 B1 | 5/2002 | Dowens et al. | |
| 6,396,908 B1 | 5/2002 | O'Donovan et al. | |
| 6,404,745 B1 | 6/2002 | O'Neil et al. | |
| 6,438,222 B1 | 8/2002 | Burg | |
| 6,445,694 B1 | 9/2002 | Swartz | |
| 6,452,922 B1 | 9/2002 | Ho | |
| 6,463,146 B1 * | 10/2002 | Hartley et al. | 379/215.01 |
| 6,463,414 B1 | 10/2002 | Su et al. | |
| 6,584,097 B1 | 6/2003 | Malik | |
| 6,594,255 B1 | 7/2003 | Neuman | |
| 6,707,811 B2 | 3/2004 | Greenberg et al. | |
| 6,717,938 B1 | 4/2004 | D'Angelo | |
| 6,744,761 B1 | 6/2004 | Neumann et al. | |
| 6,757,274 B1 | 6/2004 | Bedingfield et al. | |
| 6,763,226 B1 | 7/2004 | McZeal, Jr. | |
| 6,775,370 B2 | 8/2004 | Burg | |
| 6,785,708 B1 | 8/2004 | Busey et al. | |
| 6,788,677 B1 | 9/2004 | Fukuyama et al. | |
| 6,801,928 B2 | 10/2004 | Nuestro | |
| 6,822,957 B1 | 11/2004 | Schuster et al. | |
| 6,999,478 B2 | 2/2006 | D'Angelo | |
| 7,145,898 B1 | 12/2006 | Elliott | |
| 7,302,051 B1 | 11/2007 | Strandberg | |
| 7,342,919 B2 | 3/2008 | Zhang et al. | |
| 7,346,671 B2 | 3/2008 | Hankejh et al. | |
| 7,978,685 B1 | 7/2011 | Reams, III | |
| 2001/0038624 A1 | 11/2001 | Greenberg et al. | |
| 2002/0073206 A1 | 6/2002 | Jawahar et al. | |
| 2003/0147382 A1 | 8/2003 | Neuman | |
| 2004/0057569 A1 | 3/2004 | Busey et al. | |
| 2005/0041678 A1 | 2/2005 | Nuestro | |
| 2005/0220086 A1 | 10/2005 | Dowling | |
| 2005/0220087 A1 | 10/2005 | Dowling | |
| 2005/0226228 A1 | 10/2005 | Dowling | |
| 2005/0232244 A1 | 10/2005 | Dowling | |
| 2005/0232245 A1 | 10/2005 | Dowling | |
| 2005/0232246 A1 | 10/2005 | Dowling | |
| 2006/0188086 A1 | 8/2006 | Busey et al. | |
| 2006/0203993 A1 | 9/2006 | Busey et al. | |
| 2006/0209797 A1 | 9/2006 | Anisimov et al. | |

OTHER PUBLICATIONS

Keiichi Yasumoto Klara Nahrstedt, "Ravitas: Realistic Voice Chat Framework for Cooperative Virtual Spaces", 2005 IEEE.

Dugki Min, et al., "A Distributed Multimedia Conferencing System for Distance Learning", Multimedia Software Engineering, 1998 Proceedings, International Workshop on Apr. 20-21, 1998, pp. 88-95.

Gary Thom, "The Multimedia Communications Standard for Local Area Networks", IEEE Communications Magazine, Dec. 1996, p. 52-56, vol. 34, No. 12.

Online Services as Distributed Meeting Support Software; Proceedings of the 1995 ACM SIGCPR Conference on Supporting Teams, Groups, and Learning Inside and Outside the IS Function Reinventing IS Table of Contents, Nashville, Tennessee, United States, pp. 213-222.

European Patent Office Search Report for Corresponding European Patent Application No. 00111052.7.

* cited by examiner

VOICE-OVER-IP ENABLED CHAT

This application is a continuation of U.S. patent application Ser. No. 12/643,005, filed on Dec. 21, 2009, now U.S. Pat. No. 8,355,349, issued on Jan. 15, 2013, which is a continuation of U.S. patent application Ser. No. 11/189,281, filed on Jul. 26, 2005, now U.S. Pat. No. 7,660,294, issued on Feb. 9, 2010, which is a continuation of prior application Ser. No. 09/326,263, filed on Jun. 7, 1999, now U.S. Pat. No. 7,039,040, issued on May 2, 2006, all of which are herein incorporated by reference in their entirety.

FIELD OF THE INVENTION

The present invention relates generally to the field of telecommunications networks. More particularly, the present invention relates, in one aspect, to combined networks for simultaneous voice and data communications. Still more particularly, aspects of the present invention relate to voice communications using data network protocols while permitting anonymous voice conversation participants to maintain separate simultaneous data communications links with each other or other online users.

BACKGROUND OF THE INVENTION

Currently, communications using the Internet (or other data network) permit users to communicate with one another anonymously over dialed-up or other access lines. For example, online service providers allow users to connect their personal computers (PCs) together for purposes of anonymously communicating with one another in online text discussions using so-called "channels," "virtual rooms" or "chat" rooms (or any of a number of similar constructs). Text "chats" take place in such chat rooms by users sending text to one another; some text chat participants may merely observe ("listen"). Once a chat session is in place, online service users may elect to enter or exit a session at will. Generally, users taking part in a chat are listed or otherwise indicated on each session user's computer screen in terms of "nicknames," or "handles" to preserve user anonymity—a hallmark of chat and many other forms of online communications.

Recently, features such as "sub-chats" or "private chats" have been provided in some online contexts by which a subset (self-selected or upon request by others) of the on line chatters are moved to a separate chat (virtual) venue. Another feature available in some chat sessions is "Instant Messaging" or similar-named facility by which one user in a chat session is able to send direct (text) messages to one or more other users taking part in the chat. Thus, if side comments not appropriate for general observation are desired between two users, selection (usually by a screen message button) of the instant messaging feature results in a window on the selecting user's computer screen along with prompts for the intended message recipient and the content of the message. When the message originator completes these fields and a Send (or similar) screen button is pressed (clicked on), the message is sent privately to the intended recipient using the hosting chat server's message facilities. Typical uses of these instant messages include setting up private chat rooms and inviting others to join. While the chat sessions described above are all text chat rooms, i.e., all communication is via text messages between the chat session users, provision has been made of late for voice chat rooms. In typical voice chat rooms a number of users participate in a manner similar to a discussion by way of a telephone conference call. The mechanism by which such voice chat sessions operate is usually the same or very closely related to those used in text chats. Thus, in typical arrangement, a functional voice chat "layer" is added over what is basically a text chat session control mechanism, thereby reducing the number of changes required at the chat server to effectuate voice capabilities. Such voice chats proceed entirely within the chat server (or servers for distributed chat networks); no connection to the telephone network by the chatter (other than a data link via modem to a data network access point) is required. While such voice chat conversations typically prove satisfactory for many purposes, private voice chat room functionality has not emerged. Among the factors contributing to this condition are network host capacity and complexity of changes at such network chat hosts.

One approach to introducing voice communications between a chat session is described in co-pending patent application entitled "Anonymous Voice Communication" by R. B. Leipow, Ser. No. 08/673865, filed Jul. 2, 1996 and assigned to the assignee of the present application. In that application, which is hereby incorporated by reference in the present application as if set forth in its entirety herein, a trusted agent is used to establish voice communications between online parties while maintaining anonymity of the parties. The trusted agent is illustratively implemented as an adjunct to processor functions at a network server, such as an online chat server. Other recent voice chat improvements are described in copending application Ser. No. 09/111,672 by A. DeSimone entitled "Anonymous Voice Communication Using OnLine Controls," filed Jul. 8, 1998 and assigned to the assignee of the present application. This last-cited application is also hereby incorporated by reference as if set forth in its entirety herein.

While efforts to achieve anonymous telephone communications between users in contexts like online chat sessions have proven possible, such efforts have generally required significant modifications at an online server. In addition, prior voice chat arrangements have typically required that each participant in the voice conversation either have two telephone lines, or have required that the existing online text chat or other data connection be terminated and the subscriber telephone line used with a normal voice telephone.

SUMMARY OF THE INVENTION

The present invention overcomes limitations of the prior art and achieves a technical advance in providing anonymous voice communications using the telephone network and data communications links under the direction of a Call Broker and associated network elements.

In an illustrative embodiment, a user (the call initiator) present in a chat room session establishes a data connection to a Call Broker site using, e.g., an Internet web browser. After using the browser or the like to provide appropriate billing qualification (e.g., using credit card information) and to provide a callback number, the initiator receives a call-control information applet from the Call Broker site to which it connected, thus establishing a Call Broker session. As is known, credit card information is advantageously captured in the browser to allow transfer over the Internet in encrypted form without requiring additional security measures in the applet. In this first illustrative implementation, the session is to be billed to the initiator.

The information received from the Call Broker typically includes session information and a Participant Authorization Code (PAC). Using an instant messaging or similar mechanism, the initiator causes session information and participant codes to be passed to one or more selected chat participants in the current chat room. When a chosen participant uses the received session information in contacting the identified Call Broker, and enters the received participant code and a callback number, the Call Broker in cooperation with a Network Adjunct Processor (NAP) completes voice links to the initiator and the selected participant(s), typically in that order. The telephone call is thereby completed between the initiator and selected chat session participant(s) without sharing telephone numbers. The process of supplying session and PAC (or similar authorization) information can be used to add other participants in the text chat room to the voice session.

In accordance with an aspect of the present invention, the need for each party to have a second subscriber line is advantageously avoided by having the Call Broker arrange to have the voice link for at least one selected (text) chat session participant (typically including the voice chat initiator) completed as a Voice over IP (VoIP) link. Voice links to one or more other participants in the voice call may be completed over the Public Switched Telephone Network (PSTN) or otherwise than via VoIP links.

In accordance with another aspect of the present invention, when a PSTN link that the Call Broker (acting in cooperation with a NAP) seeks to make to a call participant is found to be busy (with the ongoing text chat conversation or other online call), the call is advantageously sent to the Internet Service Provider (ISP) or other data network access provider serving the online called party. The ISP or other access provider then causes a message to be sent to the online party sought to be engaged as a voice call participant. Typically, this message provides a range of options for the (called party) online user, e.g., to terminate the online session, to receive the incoming voice call through a VoIP link, or to have the incoming voice call rejected or delayed. The voice call is then handled in accordance with the option selected by the online user.

BRIEF DESCRIPTION OF THE DRAWING

The above-summarized description of illustrative embodiments of the present invention will be more fully understood upon a consideration of the following detailed description and the attached drawing, wherein.

DETAILED DESCRIPTION

Illustrative System Overview

Figure 1:
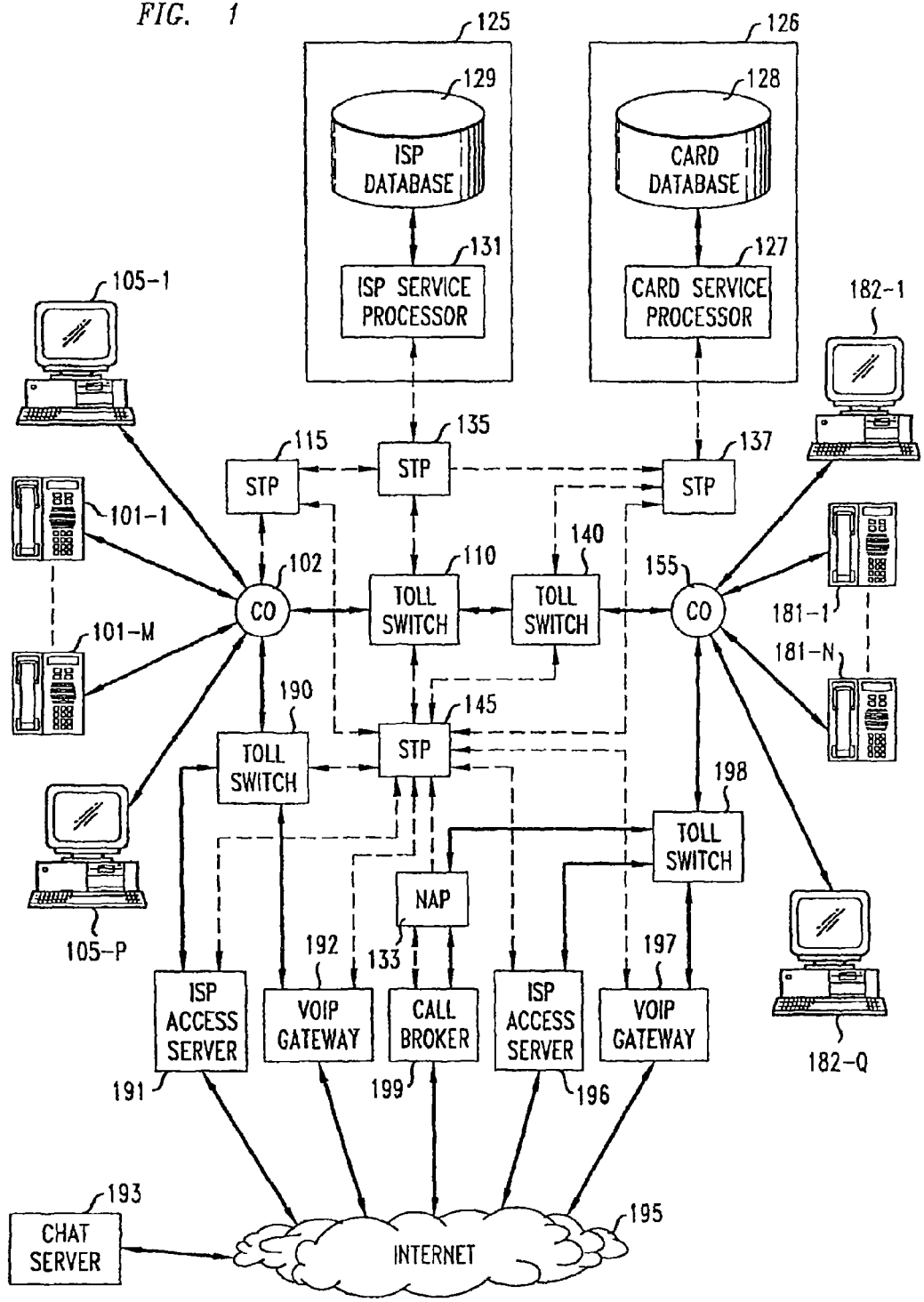
FIG. 1 is an overall view of an illustrative system embodiment of the present invention showing the interconnection of a traditional voice network interconnected with the Internet through ISP access servers and voice over IP (VOIP) gateways.

FIG. 1 shows an illustrative network for use with a range of embodiments of the present invention. There, first and second pluralities of telephone stations 101-1 through 101-M and 181-1 through 181-N are shown connected to respective central offices 102 and 155. These central offices are, in turn, connected to representative toll switches 110 and 140 to permit normal voice calling between telephone stations in respective pluralities of telephone stations. Central offices 102 and 155 are also shown connected to representative signal transfer points (STPs) 115 and 137, which STPs are, in turn, shown interconnected through a signaling network of STPs also comprising STPs 135, and 145. These STPs and their interconnection are typical of signaling system 7 (SS7) signaling networks well known in the telecommunications arts. The illustrative network of FIG. 1 also includes additional toll switches 190 and 198. In appropriate circumstances, some or all of the toll switches shown in FIG. 1 may be operated by a local exchange carrier (I RC), an interexchange carrier (IXC), or another entity. While each of the switches are shown interconnecting with STPs in FIG. 1, it will be understood that, in particular cases, some switches may not themselves include SS7 capabilities, and so are connected to the SS7 network through another SS7-enabled switch.

Also shown interconnected with the standard voice network arrangement described so far with reference to FIG. 1 are illustrative network services platforms 125 and 126, shown as including respective processors 131 and 127, as well as respective database systems 129 and 128. These latter service platforms are illustrative of so-called intelligent network platforms that include service control points, SCPs, (or network control points, NCPs), known in the art. For example, network platforms include the well known 8xx (toll-free calling) and calling card platforms. In typical fashion, platforms such as illustrative platforms 125 and 126 in FIG. 1 receive queries, commands or other information and illustratively provide routing, authentication and other control information.

In the illustrative network embodiment shown in FIG. 1, platform 126 advantageously serves as an SCP configured to provide calling card validation functionality. Thus platform 126 is arranged to receive calling card queries from network switches through one or more of the STPs shown in FIG. 1, and to provide authentication (or not) for the received account information and personal identification number (PIN) or other identification appropriate to the circumstances.

Further descriptions of telephone networks of the type shown generally in FIG. 1 may be found in the literature, including, e.g., *Intelligent Networks*, by Jan Thomer, Artech House, Norwood, Mass., 1994, and *Signaling System* 7, by T. Russell, McGrawHill, New York, 1995.

The network of FIG. 1 also shows first and second pluralities of computers, workstations or computer terminal devices (collectively, "computers") appearing as 105-1 through 105-P, and 182-1 through 182-Q. These computers may be desktop or portable computers, or may be terminals connected through a centralized computer, all to provide users with keyboard and other input facilities (such as a mouse or other pointing device) and display facilities well known in the art. In typical operation, these computers are arranged to communicate over the PSTN or other telephone network using standard modems, and to connect to one or more Internet Service Providers (ISPs) through portions of such telephone networks for access to the Internet (shown as the "cloud" 195 in FIG. 1), including chat and messaging facilities of the Internet.

Hardware in computers 105-i and 182-j will typically include a sound card, such as-the well-known SoundBlaster sound cards or those available form Voyetra Turtle Beach, Inc., for, among other things, converting speech inputs from a microphone into digitized speech signals and for converting received digitized speech signals into analog speech signals for driving a loudspeaker or earphones. In some cases this sound card functionality is built into a computer motherboard, or may be provided in an external device used with the computer.

Software executing in computers 105-i and 182-j will typically include an Internet "browser," such as are available from Microsoft Corporation or Netscape Corporation, among others, for interacting with Internet facilities. In some cases, such browser software may be augmented by add-on or plug-in software for introducing or upgrading messaging and/or chat software. In one illustrative case, both user (client) and server software (executing at an ISP access server, or related network server) will be based on well-known chat components such as mIRC client and server software by mIRC Co. Ltd. which is available on the Internet. Further information about well-known chat software and procedures is available from the Undernet User Committee web site. Of particular note is Network Working Group Request for Comments: 1459, by J. Oikarinen and D. Reed, May, 1993, available at the Undernet web site. This latter document presents a version of the Internet Relay Chat (IRC) Protocol that has provided important bases for current chat implementations. Other particular client/server implementations of various chat functionalities include several quIRC chat software modules and those available from Activerse, Inc. Client software is also available as components of browser software and from ISPs such as AT&T Worldnet and America Online for interacting over chat and messaging facilities.

In illustrative operation of the network of FIG. 1 for Internet connections, a user at one of the computers, such as 105-1 in the network of FIG. 1 will gain access to an ISP access server, such as server 191 in FIG. 1, through a dial-up connection by way of central office 102 and toll switch 190. In some cases, the ISP access server will connect directly to a central office, such as 102 in FIG. 1, and in other cases, additional toll or other switches will be used to connect the user at computer 105-1 to an ISP server such as 191 in FIG. 1.

Once connected to access server 191, the user at computer 105-1, and other users at other computers such as computers 105-i and 182-j shown in FIG. 1, will typically login in well known fashion and begin interacting with Internet facilities. Among the activities pursued by users are the aforementioned chat facilities. For example, terminal 105-1 and 182-1 may be connected through respective ISP access servers 191 and 196 (which servers may be under the control of the same ISP, or independently controlled) to chat server 193 over the Internet. The chat server may, of course, actually be one of the access servers, or an ISP server connected in a distributed network with the access server—or the chat server may be independent of either or both of the ISPs.

It will be appreciated that connections between computers such as 105-i or 182-j are typically to central offices such as 102 and 155 over normal dial-up subscriber telephone lines, e.g., from a user's home or office. While many homes and offices are supplied with more than one subscriber line, many locations, especially homes, have only a single active subscriber line entering the premises. In other cases where more than one subscriber line may be present, the user of a computer such as 105-1 may only be allowed to use one subscriber line for all of his/her communications. For example, in a two-line household, one line may be reserved for business or other dedicated purpose of one member of the household. Thus, all Internet connections and voice conversations by other members of the household normally must be pursued using the remaining line.

Accordingly, when a user at a location with only a single available line is active in an Internet session, e.g., to a chat room, the line is unavailable to originate or receive normal telephone calls using a telephone such as 101-1. In other cases, of course, a computer such as 105-1 and a telephone station set such as 101-1 may have separate subscriber lines and may be active simultaneously without conflict.

One application of the teachings of the incorporated DeSimone application, Ser. No. 09/111,672, permits a first user engaged in a text chat session to contact a "Call Broker" to obtain a so-called "Participant Authorization Code" (PAC) and a session identifier, which information is then supplied to one or more other chat participants. The first user will typically provide payment information and a callback telephone number. When one or more of the other chat participants contacts the Call Broker and supplies the session and PAC information (typically provided in the chat or messaging context by the first user), along with respective callback telephone numbers, the Call Broker seeks to establish a telephone connection between the chat participants electing to take part, usually including the first user. Using this approach, the anonymity of the telephone call participants is maintained, as it typically is in the text chat session.

Of course, if one or more of the would-be participants in the telephone call has but a single available subscriber line at the user location, then an attempt by the Call Broker to complete a telephone call to the callback number over the PSTN will normally not be successful if the user at that location continues to be active in the Internet text chat session or other computer calling activity. This problem is addressed in U.S. Pat. No. 5,805,587, issued on Sep. 8, 1998 to J. H. Norris and T. L. Russell and assigned to the assignee of the present invention. In one aspect, the last-cited patent (hereinafter, the '587 patent) describes sending of a message to a user who is online to an ISP or other server. The message provides information regarding a telephone call directed to the subscriber line currently being used for the online call. A user is typically presented with a range of options, including terminating the computer call in favor of receiving the incoming voice call on a telephone set. The '587 patent is hereby incorporated by reference in the present application as if set forth in its entirety herein. *Voice-Over-IP Enhanced Chat*The present detailed description will now treat extensions and enhancements of prior voice chat arrangements described above. In one aspect, we describe modification to the network of FIG. 1 as presented above, and further describe alternative modes of operation of such a modified network.

The term "voice-over-IP" (VoIP) has come to reflect a variety of network elements, techniques and technologies, all contributing, in one way or another, to the transmission of a voice call in accordance with the Internet Protocol (IP) over at least a part of its path between one or more voice callers and one or more other voice call participants. Thus, a voice telephone call in digital form is segmented in well-known ways into packets for transmission in the same form as for other IP sessions, such as for text information over computer connections to chat rooms. These voice information packets may be routed to a voice chat server, which often operates in a "layer" above the normal text chat—as noted above.

In other cases, voice packets may be delivered to a VoIP "gateway" where, after suitable authentication and collection of billing or account data, they are delivered through the Internet or other LP network for ultimate delivery to one or more call participants. VoIP gateways and associated network elements are available from many suppliers. For example, eFusion, Inc., Lucent Technologies, Inc and VocalTec Communications market such VoIP gateways and related products to enable interconnections between the Public Switched Telephone Network and data networks (including the Internet). The Internet Engineering Task Force (IETF), the iNOW industry consortium and other standards bodies are considering various proposals for enabling Internet telephony applications. Other aspects of VoIP are described, e.g., in *Delivering Voice over IP Networks*, by D. Minoli and E. Minoli, John Wiley & Sons, 1998.

In an illustrative application of VoIP arising from text chat sessions, an eFusion EP telephony gateway is used to interact with Internet-enabled client software (including, e.g., Internet Call Assistant—ICA-software) at a host computer, such as user computer 105-1 in FIG. 1. The VoIP client software at user computer 105-1 is typically provided as a plug-in to the browser software otherwise operating at that computer when online. This client VoIP software will illustratively provide for a login at the exemplary eFusion VoIP gateway, e.g., 192 in FIG. 1, each time the user at computer 105-1 gains access to the Internet through illustrative ISP 191 in FIG. 1. Among other things, the VoIP login (which typically is effected automatically by the plug-in software, without overt action by the user) provides gateway 192 with information that user 105-1 is online to the Internet and can receive incoming IP packets from the gateway when required.

For present illustrative purposes, it suffices to treat text chat sessions as existing between chat clients at user computers such as 105-1 and 182-1 through respective ISP access servers such as 191 and 196 to a chat server 193 in FIG. 1. As will be understood by those skilled in the art, the actual chat server function may be provided at the ISP access server (or networked in a distributed ISP network to a related ISP chat server), or by another entity providing the chat function on the Internet.

Also included in the network of FIG. 1 is a Call Broker 199 of the type described generally in the above-cited incorporated DeSimone patent application. In particular, Call Broker 199 receives requests from a first Internet user (hereinafter the "host") and, after performing authentication and account operations, provides the above described session and PAC code information to the host. Upon appropriate further access by those possessing session and PAC information (hereinafter, the "participants"), and upon receipt of callback numbers for the participants, Call Broker 199 seeks to complete telephone calls to those participants at their respective callback numbers. Alternative modes of operation of such a Call Broker in the context of the network of FIG. 1 will be described in the sequel.

Figure 2:
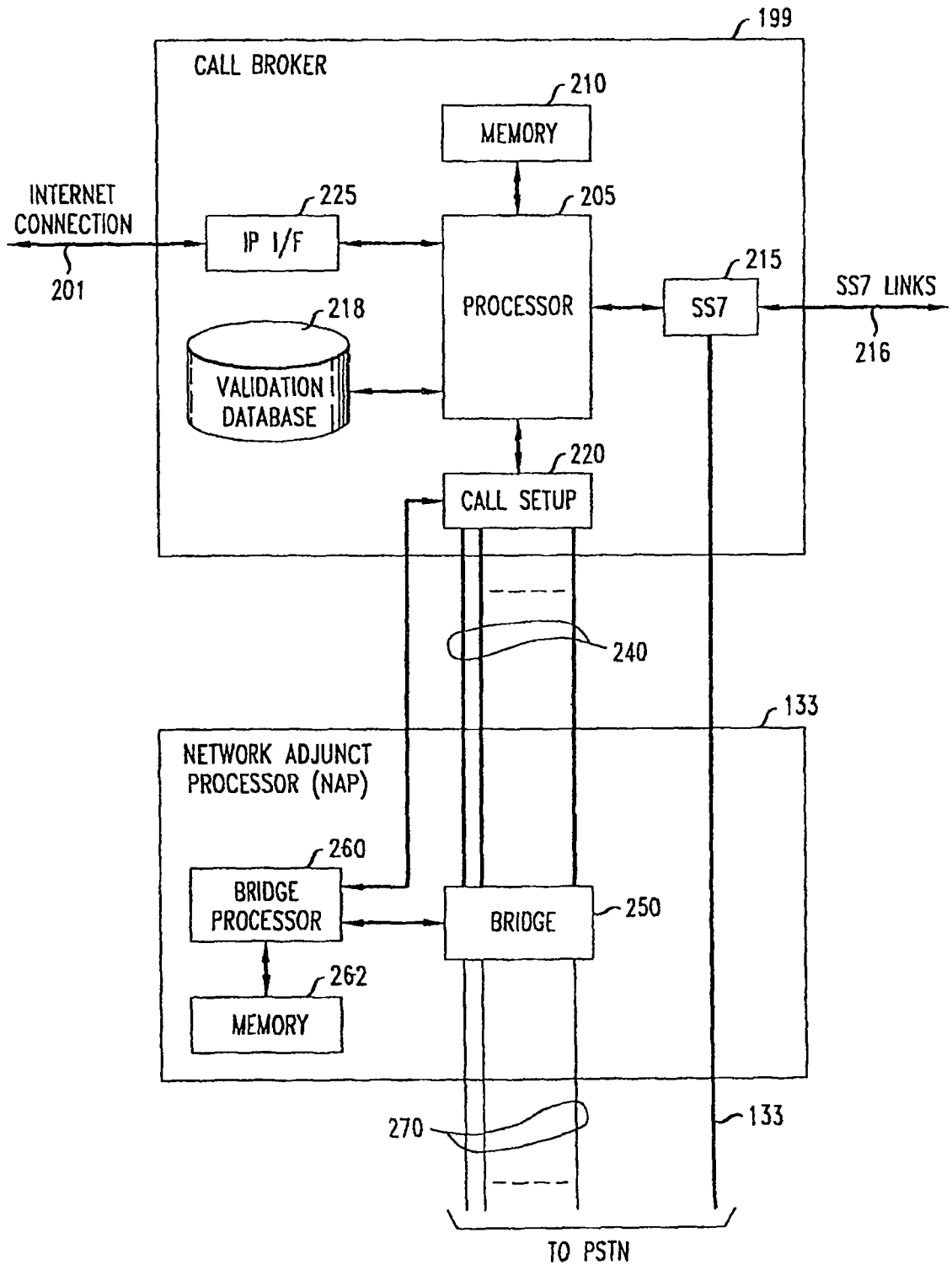
FIG. 2 shows a typical Network Adjunct Processor (NAP) in combination with a Call Broker for use in the illustrative system of FIG. 1.

An additional network element shown in FIG. 1 is Network Adjunct Processor 133 interposed between PSTN elements (STP 145, toll switch 198) and Call Broker 199. NAP 133 advantageously provides bridging of calls setup by Call Broker 199 and typically acts in response to control signals from Call Broker 199. More particularly, as shown in FIG. 2, Call Broker 199 receives requests over input 201 to set up calls from users participating in chat rooms and elsewhere in Internet or other data network sessions. Call Broker processor 205, operating under control of a program stored in memory 210, and responding to input requests through Internet Protocol (IP) interface 225, sends queries (typically over SS7 signaling links 216, via SS7 facilities unit 215) to a validation server such as card server platform 126 in FIG. 1. In some embodiments, it proves useful to provide for local account validation at Call Broker 199. Thus, Call Broker 199 is shown in FIG. 2 as including a validation database 218 for interacting with processor 205 in accordance with well known validation processes.

Signaling information exchanged (via SS7 links 216 or otherwise) will typically be employed to perform call rating and billing operations, as is known in the art. Other particular account validation, and particular call rating and billing arrangements, will be employed by those skilled in the art as circumstances may suggest. Upon receipt of authorization from validation server 126 (or other validation source), Call Broker 199 sets up voice links as will be described below.

Network Adjunct Processor (NAP) 133 receives control information on path 230 from the call setup facilities of Call Broker 199 and hands off originations from Call Broker 199 to the PSTN. These call originations from Call Broker 199 pass through NAP 133, illustratively via voice trunks 240 and 270. Also shown passing by way of NAP 133 are SS7 links 263 to the PSTN, which links are used by call setup unit 220 and processor 205 in Call Broker 215 in establishing connections to the parties to a desired voice call. In particular, answer signaling information indicating that a called party answers a voice call setup by Call Broker 199 is used to pass control information over path 230 to bridge processor 260 in NAP 133 as shown in FIG. 2. When calls to two or more parties to a desired voice call have answered the calls setup by Call Broker 199 (and therefore are available for bridging), NAP provides the selective bridging of calls passing from Call Broker 199 to the PSTN. As shown in FIG. 2, NAP 133 includes bridge 250. In performing its interaction with Call Broker 199, NAP advantageously performs such network functions as collecting DTMF digits, playing tones and prompts and selectively muting a call leg.

Thus, using the facilities of FIGS. 1 and 2 voice calls are completed between users present in a text chat room while preserving host and other participant anonymity. Call Broker 199 may be implemented as a special purpose platform or may be realized as a well-known PBX with standard SS7 and IP interface facilities. Many so-called unPBX systems, or generally programmable switches, will likewise find application in this context. For a description of such unPBX systems, reference may be had to *Computer Telephony*, May, 1997, pp. 20-97. NAP 133 may likewise be implemented using a special purpose bridging platform, or using well known PBX (or unPBX) or other programmable switches. While Call Broker 199 and NAP 133 may provide separate functionality in separate physical systems, it will prove advantageous in many applications to combine the data, signaling and PSTN interfaces and the described switching and call control functionality in a single unit with combined or coordinated processing and memory. Call setup and bridging functions are individually well known and are readily combined in a single unit such as a PBX or unPBX.

Figure 3:
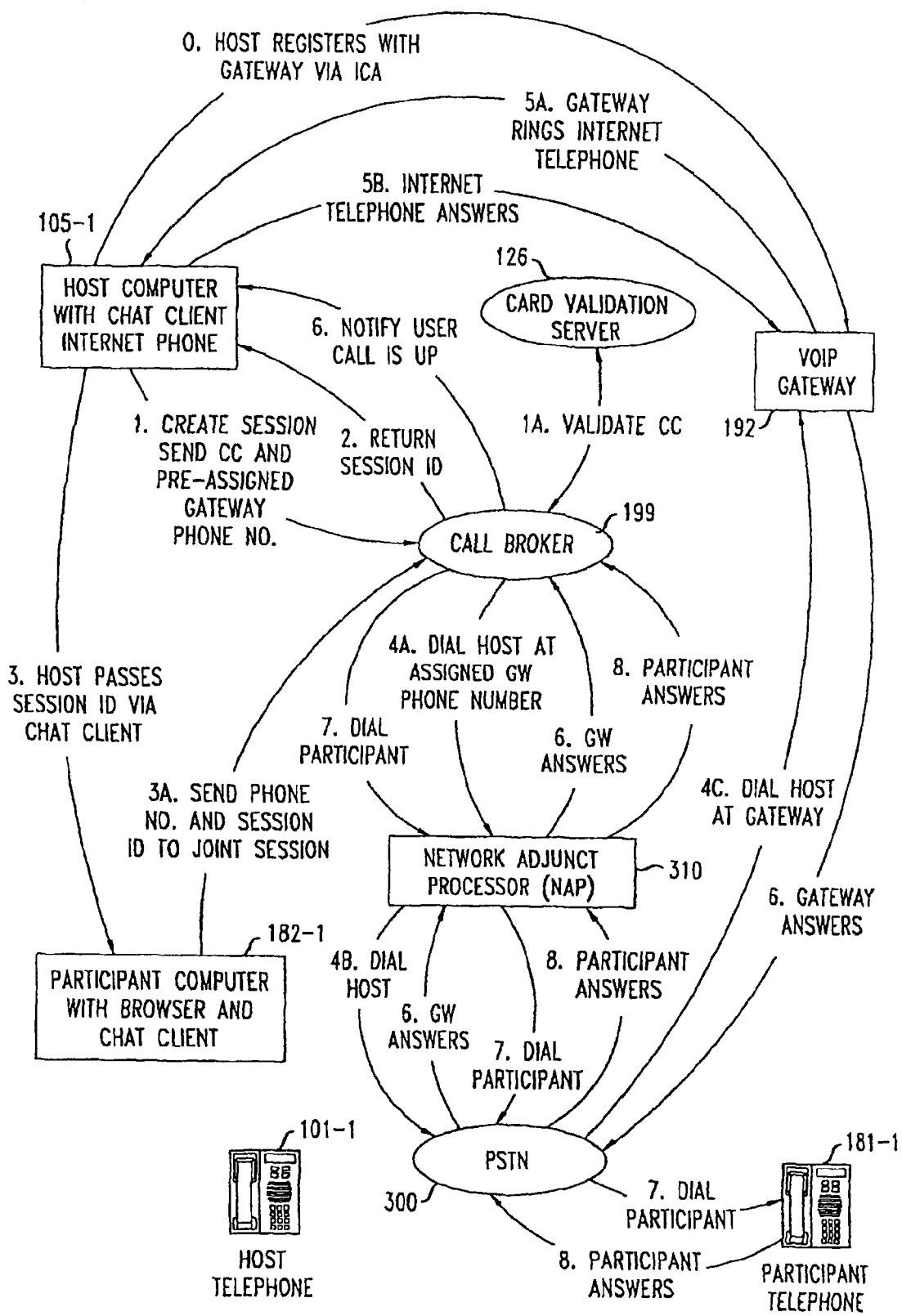
FIG. 3 shows a flow-sequence chart illustrating an alternative mode of operation of the network of FIG. 1 to achieve data and voice connections between or among users, which mode of operation avoids the need for each user to have two lines.

FIG. 3 is a flow-sequence diagram illustrating operations at and between elements of the network of FIG. 1 in processing voice calls in cooperation with ongoing (text) chat operations. For purposes of simplicity of presentation, a description of the operations shown in FIG. 3 will proceed primarily in terms of voice calling between a first (originating) user ("the host") and a second network user, the "participant." This mode of operation is conveniently referred to as a one-to-one voice call. It will be recognized, however, that the operations to be described can be applied in a context of plural participants, i.e., a one-to-many voice call scenario, or voice chat "conference call. PSTN 300 is used in FIG. 3 to represent the telephone network switches, including central offices, STPs and standard telephone network platforms such as calling card SCP 126. Network Adjunct Processor 133 and Call Broker 199 are platforms of the type shown in FIG. 2 for performing the functions and steps to be described in the following elaboration of processing in accordance with FIG. 3.

A typical operating sequence in accordance with FIG. 3 will now be followed in order of the numbered steps shown there. In particular, an illustrative sequence begins (Step 0) with host computer 105-1 logging onto the VoIP gateway 192, using, e.g., the above-noted eFusion VoIP functionality in host computer 105-1 cooperating with gateway 192 (or 197). Since this log-on process typically occurs each time the user logs onto the Internet, it is accompanied by the busying of the available subscriber phone line.

This log-in process between illustrative computer 105-1 and VoIP system 192 typically includes an exchange of messages whereby the computer 105-1 sends a login ID/password and its current IP address; gateway 192 compares the login ID/password to previously-provisioned information stored in tables at gateway 192 and returns a confirmation message if the comparison yields a match.

With log-on to the VoIP gateway established, an existing (or a newly entered) text chat illustratively gives rise to a desire on the part of the host user to establish a voice telephone call with one (or more) participants. Toward this end, the host 105-1 sends a request (Step 1) to the Call Broker 199 seeking to create a voice call by way of the chat session, and including billing or account information—typically calling card (or pre-paid card) account and PIN information. Assuming the call is to be billed to a calling card for which the host is an authorized user, the calling card information is compared with existing account information (Step 1A) to validate the card information. In some cases it will prove convenient to provide validation services locally with respect to the Call Broker, and in other circumstances use of a network database such as calling card validation server (SCP) 126 shown in FIG. 1. When Call Broker 199 receives validation of the account information (e.g., from SCP 126 or from local data base 126), the Call Broker (Step 2) returns session ID information to the host 105-1. Using the construct of the incorporated DeSimone patent application, the information returned to host 105-1 will include not only a session ID but also a PAC code.

The host 105-1 passes (Step 3) the session ID and other necessary information (e.g., PAC code, where applicable) to the desired voice call participant (illustratively, the user at computer 182-1). Such notification will typically be by way of a private message (e.g., a direct message in the text chat session) to the desired participant. A notified text chat participant receiving the voice call session information from the host and desiring to participate in the voice call then sends (Step 3A) the session ID (and PAC, as appropriate) to the Call Broker 199 along with a callback number. The Call Broker then places a call to the host at the assigned VoIP gateway number supplied by the host at Step 1; the call is processed through the NAP (Step 4B) and is sent through the PSTN 300 to the illustrative VoIP gateway 192 associated with computer 105-1 (Step 4C). Identification of the IP address of the host (illustratively 105-1) by Call Broker 199 is conveniently accomplished by using the callback number provided by the host when contacting the Call Broker. Thus, as part of the service subscription by users such as the user at computer 105-1, a callback number is provided to VoIP gateway 192 which is conveniently used as a key into account records for the subscribing user. The callback number supplied by the host upon requesting the current voice call session from Call Broker 199 is then used to identify the online status of the destination VoIP link, as well as the corresponding IP address.

The VoIP gateway 192 then rings the Internet telephone at the host computer (Step 5A) and, upon answer by the Internet telephone (Step 5B), answers the call from Call Broker 199 by way of PSTN 300 and NAP 133 (Step 6). Having the call connected from the host, the Call Broker then dials the participant (Step 7) at the callback number provided by the participant. Unlike the call placed by the Call Broker to the host (Step 4), the call to the participant is advantageously placed over the PSTN (by way of the NAP) directly to the participant's telephone, here assumedly telephone 181-1. When the participant answers (Step 8) at telephone 181-1 the call is extended through the PSTN to the NAP. Upon receipt of the answer by both the host and the participant, the NAP advantageously bridges the call. It will be appreciated that the use of VoIP gateway in communication with host 105-1 avoids the need for two subscriber lines at the host location.

When one of the host or participant terminates the call, the termination is signaled to the NAP, which then terminates the bridge and sends accounting information to the Call Broker, if not already present at the latter. If more than one participant has been bridged on to a voice call using the above-described steps, then departure of each participant will be detected at the NAP and accumulating billing concluded for the departing participant's voice link. The accumulated total for each link will then be added to the total billing for the host. In some cases, all voice call links (and billing for these links) will be terminated upon departure of the host from the bridged call.

While the foregoing description has proceeded in terms of a voice call including a VoIP call link to the host, and a normal PSTN link to one or more participants, nothing in the present invention prevents a participant other than the host from being linked to the voice conversation over a VoIP link, nor for the host to be connected to the voice call via the PSTN instead of one or more other participants. In appropriate cases, both the host and all participants can be connected over VoIP links using the above-described process. The Call Broker can advantageously incorporate call setup optimization techniques, based, e.g., on the location of the callback numbers and congestion and available bandwidth for VoIP calls to determine which links progress over the PSTN and which links employ VoIP processing.

A second subscriber line at participants' locations can also be avoided in accordance with another illustrative embodiment of the present invention. This approach may be used, for example, when a call is placed by Call Broker 199 through NAP 310 to a would-be participant in a voice call (as described above), and that user has no available subscriber line. This unavailability will typically occur because a subscriber line at that location continues to be used for a text chat session or other data application using computer 182-1. Recall that in seeking to participate in the voice call the user at computer 182-1 supplies Call Broker 199 with a callback number. Thus, by providing the number of the line that the computer 182-1 is connected to, the would-be participant is seeking to have the voice call completed through computer 182-1, if at all, in the same fashion as was described for the host.

In accordance with the present alternative embodiment, the attempted call by NAP 310 illustratively employs the call notification technique of U.S. Pat. 5,805,587 (hereinafter '587 patent). In particular, the attempted call to the subscriber line that is busy with a data connection by computer 182-1 through its ISP access server 196 is advantageously forwarded in accordance with the teachings of the '587 patent to the ISP access server 196 (sometimes referred to as Internet Access Server or IAS). Using the incorporated teachings of the '587 patent, a message is sent to the computer 182-1 by the ISP access server informing the user at computer 182-1 of the arrival of a voice message and presenting a number of alternatives for handling the call. (In many cases it will be unnecessary to present a full range of alternatives because the user at computer 182-1 has very recently indicated an interest in taking part in a voice call.) In the general case, one alternative is to continue to use the computer for the text chat or other data connections and to also receive the voice call as converted to streaming audio or an Internet voice call. An illustrative arrangement given in the '587 patent describes the use of VocalTec software for performing the required packetizing, depacketizing and related functions used in communicating the voice call to a computer such as 182-1 in FIG. 1.

While the above-described embodiments are couched in terms of IP protocol messages and the Internet, those skilled in the art will recognize that other particular data communications protocols may be used for communicating digitized voice signals. Likewise, the characteristics of the Internet and other networks continue to evolve. Chat techniques are not uniquely associated with the Internet, nor the IP protocol.

While many of the aspects of the PSTN described above involve use of the SS7 signaling protocol, other particular signaling techniques may be used in appropriate circumstances. For example, the well-known ISDN signaling protocols can be used for many applications of the present invention.

The functionalities of the NAP described in illustrative embodiments above may, of course, be combined with those of the Call Broker, or one may be used as an adjunct to the other or to another network element, such as a PBX or PSTN switch.

While validation of host charging information was couched in terms of calling card processing in the above descriptions of illustrative embodiments, it will be understood by those skilled in the art that prepaid calling card account identification and PIN validation may be employed as well.

Likewise, the online status of a desired voice call participant, and therefore the availability of at least one subscriber line to receive a PSTN voice call, as well as the current IP address of such an online would-be voice call participant, may be maintained in a network database system represented by ISP SCP 125 in FIG. 1. SCP 125 is seen to include ISP database 129 and ISP service processor 131, each generally of the form used for other PSTN network services. Additional information stored at SCP 125 will include, in appropriate cases, alternative subscriber lines, IP addresses or other termination possibilities, such as voice message recording devices, call forwarding locations and the like. The ISP SCP 125 may serve more than one ISP, but typically relies on login and logoff information supplied by participating ISPs over SS7 links (shown in FIG. 1) or IP or other data messages (not shown). Information stored in ISP SCP 125 may be used to supplement information stored at Call Broker 199 or VoIP gateways 192, 197 or at other Internet nodes.

Though only a single Call Broker 199 is shown in the representative network of FIG. 1, it should be understood that many such Call Brokers can be included. Moreover, these plural Call Brokers may be networked and may serve as proxies for other Call Brokers as is known in standard Internet practice. In networks including plural Call Brokers session information forwarded to desired voice call participants will include information identifying the appropriate Call Broker(s).

Though the voice call links established by Call Broker 199 in the above-described illustrative embodiments were all links to existing text chat participants, in appropriate circumstances the host (or other authorizing participant) may request that Call Broker set up links to other voice call participants. In such cases, Call Broker 199 may cause voice links to be established to one or more non-chat-participant lines, either through PSTN links or through VoIP links.

What is claimed is:

1. A method comprising:
receiving, by a call broker, via a data connection, a request from a first participant requesting establishment of a voice call, wherein the request comprises a callback number of the first participant and account information;
receiving, by the call broker, validation of the account information;
sending, by the call broker, voice call session information and an authorization code to the first participant in response to the request;
receiving, by the call broker, from a second participant requesting participation in the voice call, a callback number of the second participant, the voice call session information and the authorization code, wherein the first participant and the second participant are engaged in a chat session and wherein the first participant passed the voice call session information and the authorization code as a private message in the chat session to the second participant;
establishing, by the call broker, a first voice link to the first participant using the callback number of the first participant;
determining, by the call broker, an internet protocol address associated with the second participant using the callback number of the second participant when a public switched telephone network link of the second participant is unavailable due to the public switched telephone network link of the second participant being in use in an internet session through a respective internet service provider access server;
establishing, by the call broker, a second voice link, via a voice over internet protocol gateway, to the second participant using the internet protocol address associated with the second participant; and
bridging, by the call broker, the first voice link and the second voice link so as to establish the voice call between the first chat participant and the second chat participant.

2. The method of claim 1, further comprising:
receiving, from a third participant requesting participation in the voice call, a message comprising the voice call session information and the authorization code;
establishing a third link to the third participant; and
bridging the third link, the first voice link and the second voice link, so as to establish the voice call between the first participant, the second participant and the third participant.

3. The method of claim 2, further comprising:
receiving a callback number from the third participant prior to the establishing a third link to the third participant.

4. The method of claim 2, wherein the public switched telephone network link of the second participant comprises a first public switched telephone network link and wherein the third link comprises a second public switched telephone network link.

5. The method of claim 1, wherein the account information further comprises payment information, the method further comprising:
receiving the payment information from the first participant prior to the establishing a first voice link to the first participant.

6. The method of claim 1, wherein the second voice link comprises a voice over internet protocol link.

7. The method of claim 6, wherein the voice over internet protocol link is established using the internet protocol address.

8. The method of claim 1, wherein the request further comprises information identifying a maximum number of participants.

* * * * *